Nov. 26, 1963 E. W. STUBLER Re. 25,490

DRINK MIXER ATTACHMENT

Original Filed July 18, 1958 3 Sheets-Sheet 1

Earl W. Stubler
INVENTOR.

BY Clarence A. O'Brien and Harvey B. Jacobson
Attorneys

DRINK MIXER ATTACHMENT
Original Filed July 18, 1958 3 Sheets-Sheet 2
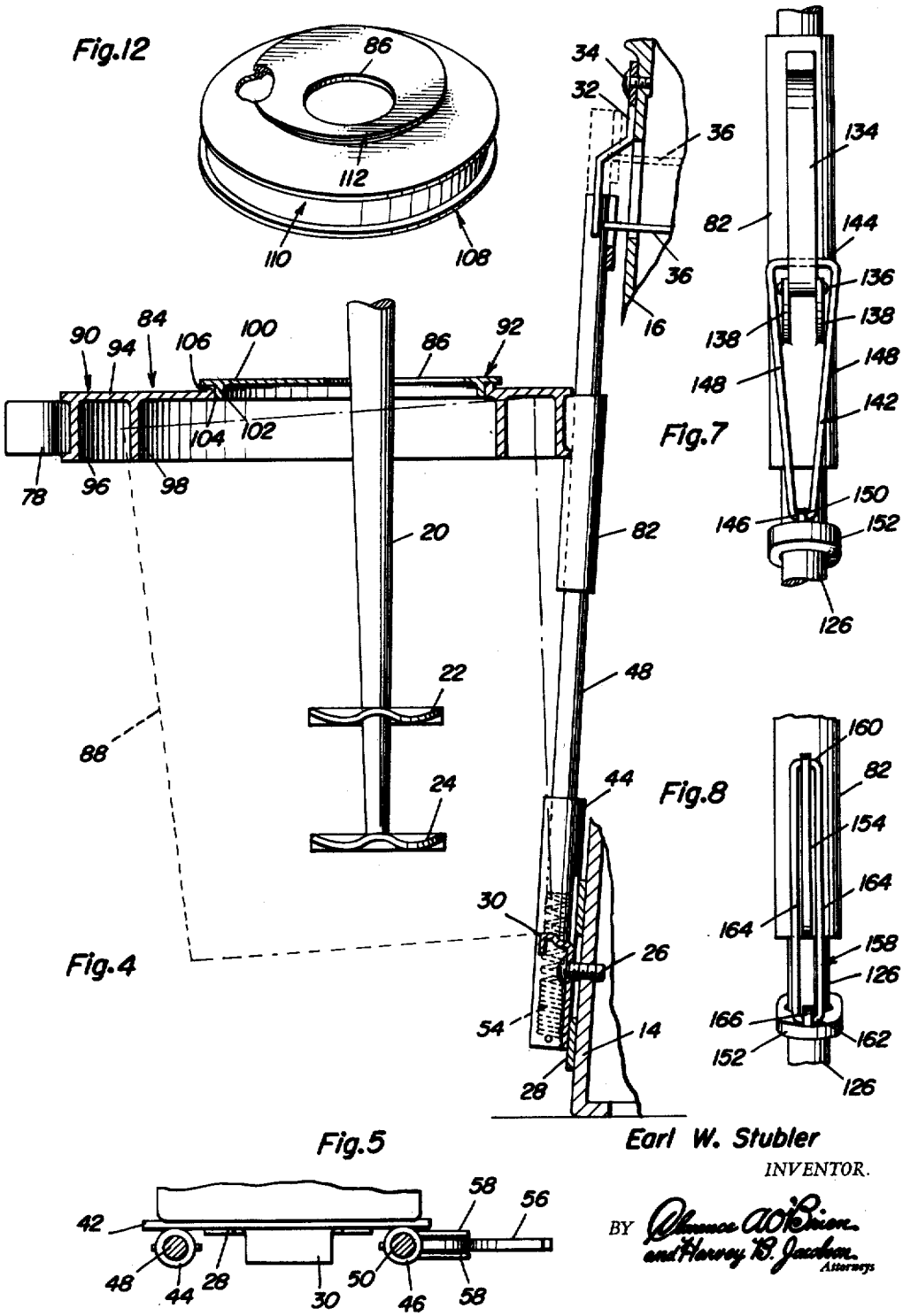
Earl W. Stubler
INVENTOR.
BY Thomas A. O'Brien and Harvey B. Jacobson
Attorneys

DRINK MIXER ATTACHMENT

Original Filed July 18, 1958 3 Sheets-Sheet 3

Earl W. Stubler
INVENTOR.

BY Clarence A. O'Brien and Harvey B. Jacobson
Attorneys

United States Patent Office

Re. 25,490

Reissued Nov. 26, 1963

25,490

DRINK MIXER ATTACHMENT

Earl W. Stubler, 4420 Meridian Ave., Seattle 3, Wash.

Original No. 3,037,749, dated June 5, 1962, Ser. No. 749,359, July 18, 1958. Application for reissue Nov. 20, 1962, Ser. No. 240,768

21 Claims. (Cl. 259—122)

Matter enclosed in heavy brackets [ ] appears in the original patent but forms no part of this reissue specification; matter printed in italics indicates the additions made by reissue.

This invention relates in general to new and useful improvements in drink mixers, and more specifically to include an attachment for converting drink mixers into mixers for accommodating paper cups and the like.

Drink mixers are primarily constructed whereby a metal cup is used for the mixing of the drink after which the drink is poured from the metal cup into another type of container for drinking. It is, however, more desirable to mix the drink in a disposable container, which container will also be used for holding the drink while being consumed. Attachments have been made for drink mixers whereby the drink mixers may accommodate the paper containers. However, such attachments will accommodate only one size of container. It is therefore the primary object of this invention to provide a cup holder attachment for drink mixers, which cup holder attachment will automatically adjust in height for holding cups of all heights thereby permitting the user of the drink mixer to have a greater range of offerings for the public which permits more competitive merchandising.

Existing drink mixers support the cup in the mixing position both on the bottom flange thereof and on the upper edge thereof. The top cup holder projects down into the cup and during the mixing operation the drink is splashed on the top cup holder with the result that the top cup holders are normally filthy from accumulation of the drink mix. Furthermore, this cup holder cannot be readily cleaned and is thus subject to contamination. Therefore, another object of this invention is to provide a cup holding attachment for drink mixers, which cup holding attachment eliminates the upper cup holder of existing drink mixers and which is of such a nature whereby it has the desired sanitation characteristics.

Another object of this invention is to provide an attachment for a drink mixer, which attachment is of such a nature whereby the cup is covered so as to prevent splashing. This eliminates the need for cautious preliminary manipulation usually necessary to avoid splashing. Furthermore, the hand may be removed from the cup immediately after it is introduced to the [mixture] *mixer*. This shortens the time needed to mix and serve the drinks.

Another object of this invention is to provide an attachment for drink mixers which is of such a construction whereby it lowers the housekeeping cost and laundry bill by abolishing splattering and spilling which necessitates constant cleaning of the mixer, adjacent equipment, surrounding fixtures and windows, as well as the uniform of the attendants.

Another object of this invention is to provide an improved attachment for drink mixers which attachment is of such a nature whereby it increases the worker's capacity because the instant the drink is introduced to the mixer, the operator is free for other duties, and because its use lessens general housekeeping demands both during the daily operation of the mixer and at closing time.

Still another object of this invention is to provide a cup holder attachment for drink mixers, the cup holder attachment being of such a nature whereby loss through spilling and the destruction of paper cups by puncturing is completely eliminated, the attachment being so constructed whereby the mixing does not begin until such time as the attachment is fully positioned.

Another object of this invention is to provide an attachment for drink mixers which is so constructed whereby it increases the production capacity because of increased conveniences, the drink mixer being of such a nature whereby each spindle can accommodate a cup of any height whereby the operator may always use the nearest or handiest idle spindle.

Still another object of this invention is to provide an attachment for drink mixers, the attachment being of such a nature whereby space is saved in a large establishment because each drink mixer spindle becomes completely versatile and automatically accommodates cups of all heights eliminating need for a greater number of spindles and mixers.

A further object of this invention is to provide an improved drink mixer attachment, the attachment being of such a nature whereby it reduces the investment necessary for equipment because the attachment makes each mixer universal thereby eliminating the requirement for a large number of mixers of a special purpose type.

A still further object of this invention is to provide an improved attachment for drink mixers, the attachment being of such a nature whereby it makes possible instant effective cleaning of the mixer at any time after the use of mixing a drink with or without removing the attachment by merely placing on the mixer a regular drink mixing cup containing water the action of which cleans all of the exposed portions of the attachment.

Yet another object of this invention is to provide an improved drink mixer attachment which is of such a nature whereby it will create a greater sales appeal in its area of use by presenting to the customers' view a drink mixer that at all times is clean in appearance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
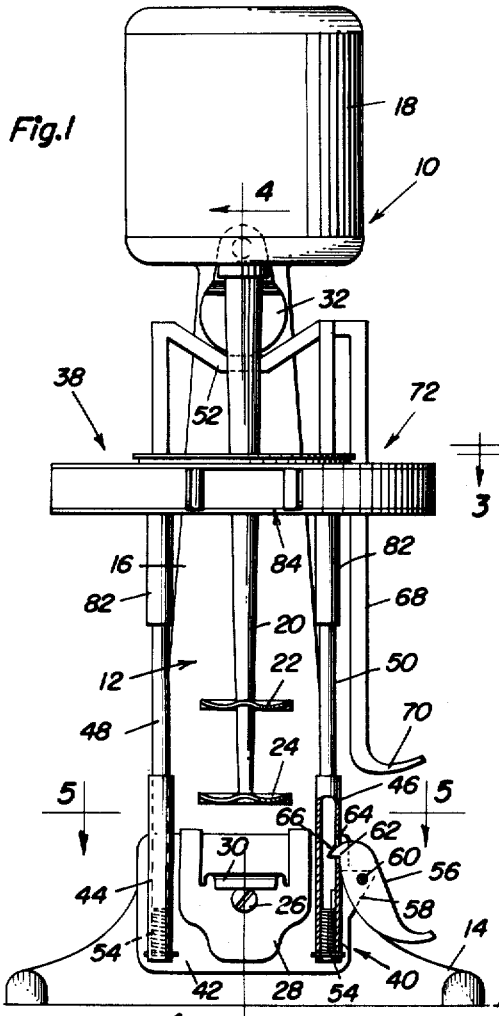
FIGURE 1 is a front elevational view of a drink mixer having mounted thereon the attachment which is the subject of this invention, with the cover being in an intermediate position.
Figure 6:
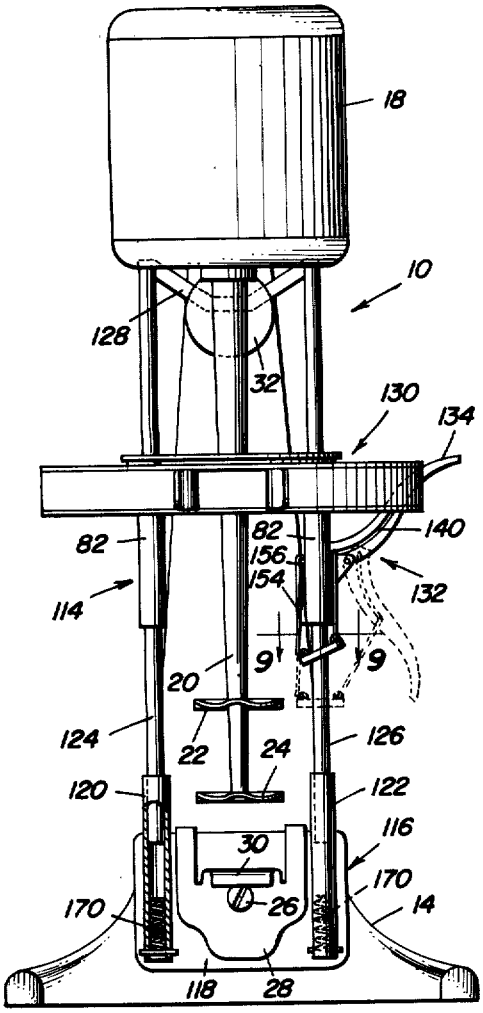

FIGURE 4 is an enlarged fragmentary vertical sectional view taken substantially upon the plane indicated by the section line 4—4 of FIGURE 1 and shows the specific details of the attachment including the relationship of the cover with respect to a cup, the elevated position of one of the supporting rods of the attachment being shown by dotted lines in a position moving the operating switch of the drink mixer to an "on" position;

FIGURE 5 is an enlarged fragmentary sectional view taken substantially upon the plane indicated by the section line 5—5 of FIGURE 1 and shows the specific details of the base of the attachment and the relationship thereof to the base of the drink mixer;

FIGURE 6 is a front elevational view of a modified form of attachment and shows the latch thereof in an inoperative position by dotted lines;

FIGURE 7 is an enlarged fragmentary elevational view showing details of the latch;

FIGURE 8 is another enlarged fragmentary elevational view taken 180° from FIGURE 7 and shows further the details of the latch.

Figure 9:
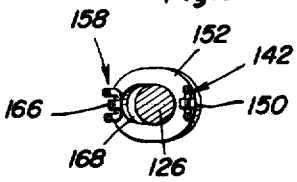

FIGURE 9 is an enlarged fragmentary sectional view taken substantially upon the plane indicated by the section line 9—9 of FIGURE 6 and shows the locking member of the latch and its relationship to one of the rods of the attachment.

Figure 10:
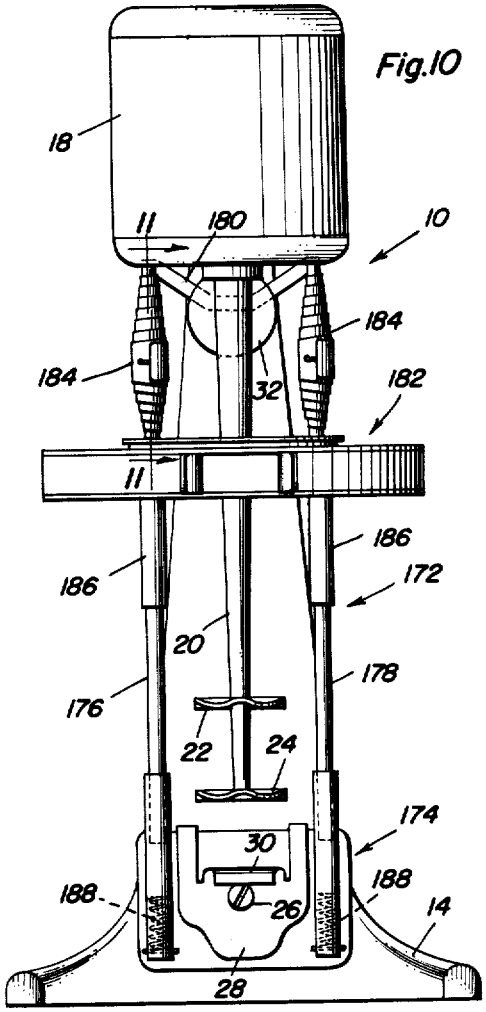
Figure 11:
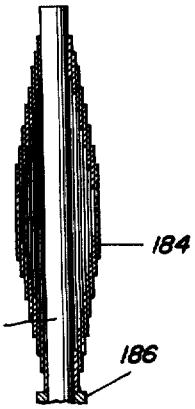

FIGURE 10 is a front elevational view of a third form of the invention and shows the general details thereof;

FIGURE 11 is an enlarged fragmentary sectional view taken substantially upon the plane indicated by the section line 11—11 of FIGURE 10 and shows the specific details of a spring for positioning the invention; and FIGURE 12 is a perspective view of a modified form of cover and shows the details thereof, a portion of the cover being broken away and shown in section to further illustrate the details of the cover.

Figure 2:
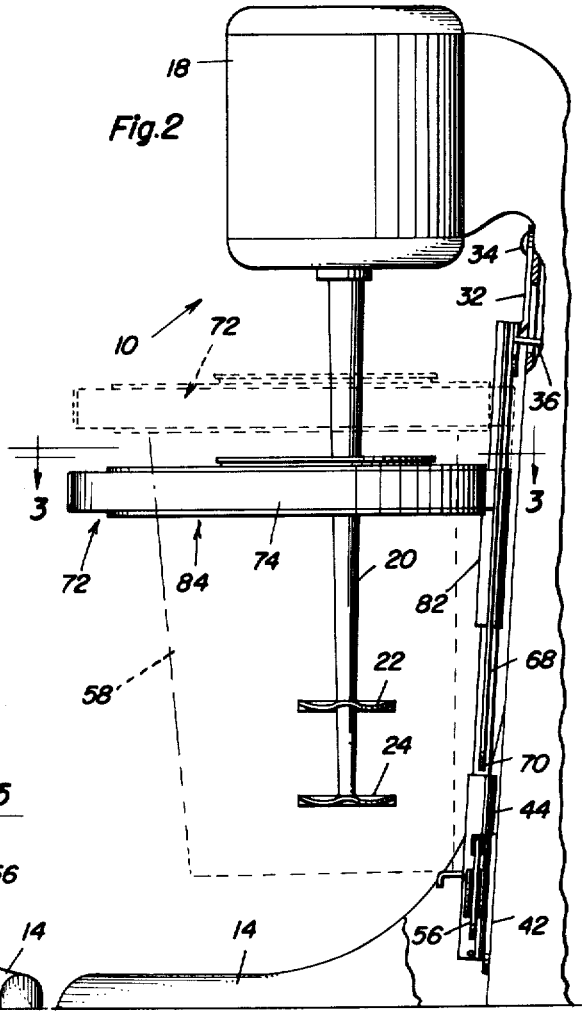
FIGURE 2 is a side elevational view of the drink mixer attachment of FIGURE 1 with a portion of the base thereof broken away for purposes of clarity, the position of a cup and the cup engaging position of the cover of the attachment being shown in dotted lines.

Referring now to the drawings in detail, it will be seen that there is illustrated in FIGURES 1 and 2 a conventional type of drink mixer which is referred to in general by the reference numeral 10. The drink mixer 10 includes a supporting frame which is referred to in general by the reference numeral 12 and includes a base 14 and an upstanding frame portion 16. The frame portion 16 has secured to the upper end thereof a vertically disposed motor 18 which has connected thereto a vertically depending shaft 20. The shaft 20 is provided adjacent the lower end thereof with suitable agitators 22 and 24.

The drink mixer 10 has secured to the base 14 by means of a single screw 26 a container or cup bottom support 28 which includes a [containing] *container* engaging ledge 30. Carried by the upper part of the frame member 16 is a cup or container guide 32 which is secured in place by means of a fastener 34. Associated with the container guide 32 is mixer control mechanism in the form of a switch control lever 36 for controlling the operation of the electric motor 18.

In the normal operation of the drink mixer utilizing standard height containers or cups, the upper portion of the cup is passed behind the guide 32 and engaging the switch control lever 36 so as to move the switch to an "on" position. Thus, as the container is being positioned relative to the drink mixer 10, the motor 18 is energized and the agitators 22 and 24 are rotated. This occurs before the container or cup is seated on the container support 28. It will thus be seen that initially there is splashing before the container is seated and it is necessary that the operator of the drink mixer 10 have a firm hold on the container otherwise the container is knocked out of the operator's hand.

When paper cups are used and the paper cups are not of a standard height, it is necessary that the drink mixer 10 be provided with an attachment which will operate the switch control lever 36 inasmuch as the paper cup will not engage the switch lever 36. One attachment provided to date will accommodate only one height of cup and must be adjusted if the cup height is changed. Another attachment is in the form of an extension collar for the cup which requires a different collar for each different type of cup.

In order to overcome the normal difficulties encountered in the operation of a drink mixer, there is provided the drink mixer attachment which is the subject of this invention, the attachment being referred to in general by the reference numeral 38. The attachment 38 includes a base which is referred to in general by the reference numeral 40. The base 40 includes a mounting plate 42 which is disposed intermediate the container support 28 and the base 14 and which is held in place by the screw or fastener 26. The mounting plate 42 has extending upwardly therefrom a pair of vertically disposed spaced parallel sleeves 44 and 46. The guiding sleeves 44 and 46 have disposed therein actuating rods 48 and 50, respectively, of an actuating mechanism for vertical sliding movement. The upper ends of the rods 48 and 50 are connected together by means of a cross bar 52 which is so aligned with the cup guide 32 so as to pass to the right of the cup guide 32, as viewed in FIGURE 2 and engage the switch lever 36.

Disposed in the lower ends of the sleeves or tubes 44 and 46 are fixed pressure coil springs 54. The coil springs 54 engage the lower ends of the rods 48 and 50 and urge the rods 48 and 50 upwardly to a position whereby the cross bar 52 will move the switch lever 36 to a position to move the switch to an "on" position. In order that the drink mixer 10 may remain inoperative except when it is in use, there is carried by the sleeve 46 a selectively releasable latch member 56. The latch member 56 is carried by a pair of mounting brackets 58 which project to one side on the sleeve 46 and which has extending therebetween a pivot pin 60 on which the latch member 56 is pivotally mounted. The latch member 56 includes a dog portion 62 which is aligned with a slot 64 in the sleeve 46. The dog portion 62 is selectively engageable in a notch 66 in the lower part of the rod 50 so as to prevent the upward movement thereof. Thus the upward movement of the rods 48 and 50 and the cross bar 52 is selectively prevented.

The dog 62 is so constructed whereby the rods 48 and 50 may be moved downwardly from their elevated positions. Thus the resetting of the latch member 56 will be automatic. The downward movement of the rods 48 and 50 is accomplished by means of an operator 68 which is secured to the upper end of the rod which terminates at the lower end thereof in a hand engaging portion 70.

Figure 3:
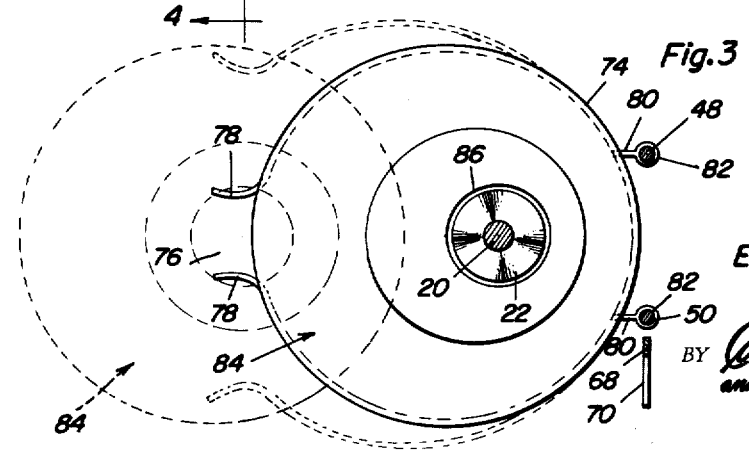
FIGURE 3 is a fragmentary horizontal sectional view taken substantially upon the plane indicated by the section line 3—3 of FIGURE 2 and shows the specific details of the mounting of the cover, the cover being shown in a partially released position by dotted lines.

Carried by the rods 48 and 50 is a cover unit or container top engaging means which is referred to in general by the reference numeral 72. The cover unit 72 includes a resilient generally circular mounting clip 74, as is best illustrated in FIGURE 3 which has an entrance opening 76 defined by a pair of flanges 78. The clip 74 is connected by means of spacers 80 to a pair of sleeves 82 disposed on the rods 48 and 50 for vertical movement.

Removably carried by the resilient clip 74 is a cover which may be of any design although a specific cover 84 has been illustrated. The details of the cover 84 will be set forth hereinafter. It is, however, pointed out that the cover 84 is of a size to engage over the container which is to be used in conjunction with the drink mixer 10. Also, the cover 84 is provided with an opening 86 through which the shaft 20 and the agitators 22 and 24 may pass.

The cover unit 72 is freely carried by the rods 48 and 50 so that the cover unit 72 may be readily moved along the rods 48 and 50. When a cup is removed, the cover unit 72 slides down until the sleeves 82 abut the sleeves 44 and 46.

In the use of the attachment 38 in conjunction with the drink mixer 10, a container, such as the paper cup 88 illustrated in FIGURE 4 is engaged with the underside of the cover 84 and the two moved upwardly until such time as the bottom of the container 88 is aligned with the container seat 28 at which time it is set on the ledge 30. With the container 88 fully seated with repsect to the drink mixer 10 and the cover 84 in place, the latch member 56 is moved to an inoperative position at which time the coil springs 54 urge the rods 48 and 50 upwardly. The upward movement of the rods 48 and 50 results in the upward movement of the cross bar 52 which in turn engages the switch lever 36 and moves it to an "on" position. The drink is then mixed within the container 88 a proper length of time without requiring any attendance on the part of the operator of the drink mixer 10. At such time as it is deemed that the mixing is completed, the rods 48 and 50 are moved downwardly by means of operator 68 at which time the switch lever 36 will be moved to its "off" position and the motor 18 discontinues its operation. By moving upwardly on the container slightly so as to disengage from ledge 30 and then moving the container downwardly, the container 88 may be readily removed from the drink mixer 10.

Referring now to FIGURES 3 and 4 in particular, it will be seen that there are illustrated the details of the cover 84. The cover 84 includes an outer portion 90 and an inner portion 92. The outer portion 90 includes a top wall 94 which has depending from the periphery thereof a flange 96. A similar flange 98 is disposed concentric of the flange 96 and inwardly of the flange 96. The space between the flanges 96 and 98 will be occupied by the upper edge of the container 88 and thus a seal between the cover 84 and the container 88 is formed.

The central portion 92 includes a top wall 100 which has disposed inwardly of the peripheral edge thereof a depending flange 102. The top wall 94 is provided with an eccentric opening 104 which is defined by a relatively short upstanding flange 106. The opening 104 is of a size to snugly receive the flange 102 and thus frictionally mount the central portion 92 within the outer portion 90. Because of the eccentric mounting of the central portion 92 with respect to the outer portion 90, and the eccentric position of the opening 86 in the top wall 100 of the central portion 92, the opening 86 may be positioned as is necessary so as to receive the shaft 20 by rotating the central portion 92 in the outer portion 90 and rotating the outer portion 90 in the clip 74. Thus the cover 84 permits the attachment 38 to be adapted to various types of drink mixers and still receive the shaft thereof.

A modified form of cover is illustrated in FIGURE 12. This cover is referred to in general by the reference numeral 108 and includes an outer portion 110 and an inner portion 112. The outer portion 110 differs from the outer portion 90 in that it is of a smaller diameter than the outer portion 90 and does not have an inner flange which corresponds to the flange 98.

Referring now to FIGURE 6 in particular, it will be seen that there is illustrated a modified form of attachment which is referred to in general by the reference numeral 114. The attachment 114 includes a base 116 which is secured to the base 14 of the drink mixer 10 by means of the fastener 26 which also secures the container bottom support 28 to the base 14. The base 116 includes a mounting plate 118 which has extending upwardly therefrom in spaced parallel relation a pair of guide sleeves 120 and 122. Disposed within the upper portions of the sleeves 120 and 122 are lower ends of actuating rods 124 and 126, respectively. The upper ends of the rods 124 and 126, like the rods 48 and 50 are connected together by means of a cross bar 128.

Carried by the rods 124 and 126 for vertical sliding movement is a container top engaging cover unit 130 which is substantially identical to the cover unit 72 and differs therefrom only in that a releasable one-way latch 132 has been added.

The latch 132 is carried by that sleeve 82 of the cover unit 130 through which the rod 126 passes. The latch 132 includes a curved lever 134 which is pivotally mounted on a pivot pin 136 carried by a pair of spaced parallel ears 138 which are secured to the sleeve 82 as best seen in FIGURE 7. The lever 134 is provided with an arcuate slot 140, which slot is best illustrated in FIGURE 6. Secured to the lever 134 is a first link which is referred to in general by the reference numeral 142. The link 142 includes an upper cross portion 144 and a lower cross portion 146, the cross portions 144 and 146 being connected together by integral legs 148 which converge downwardly from the upper cross member 144 to the lower cross member 146. The cross member 144 is disposed in the arcuate slot 140. The cross member 146 is passed through an ear 150 of a one-way lock or latch dog 152.

Secured to the opposite side of the sleeve 82, 180° from the centers of the ears 138, is a vertically elongated mounting plate 154. The mounting plate 154 is provided with a vertically elongated slot 156, as is best shown in FIGURE 6.

The latch 132 also includes a link 158 as seen in FIGURE 8. The link 158 is formed of an upper cross portion 160, a lower cross portion 162 and a pair of spaced parallel legs 164 formed integral with the cross portions 160 and 162. The cross portion 160 is disposed in the slot 156 and the cross portion 162 passes through an ear 166 which extends upwardly from the dog member 152 remote from the ear 150.

Referring now to FIGURE 9 in particular, it will be seen that the dog member 152 is generally elliptical in outline and has an elliptical opening 168 through which the rod 126 passes. When the dog member 152 is in the horizontal position, as shown by dotted lines in FIGURE 6, the latch 132 is free to slide on the rod 126 so that the cover unit 130 may be vertically positioned. On the other hand, when the dog member 152 is disposed at a slight angle to the horizontal, it will grip the rod 126 and be locked thereto. As the latch member 134 is moved upwardly, the dog member 152 will be pulled simultaneously tilted and pulled upwardly. However, because the dog member 152 will immediately grasp the rod 126, and since at this time the cover unit 130 will be resting upon the container 88, this will result in the upward movement of the rods 124 and 126, as well as the cross bar 128. In this manner the latch 132, when actuated, will operate as jack means for the rods 124 and 126 and cross bar 128. The cross bar 128 will then move the switch lever 36 to an "on" position.

Disposed in the lower ends of the sleeves 120 and 122 are fixed pressure coil springs 170. The coil springs 170 are of such length whereby the cross bar 128 will be supported immediately below the switch lever 36 when the switch is in its "off" position. Thus after the cover unit 130 has been positioned on the container 88 and the latch member 134 moved upwardly, the rods 124 and 126 need move upwardly only a short distance within the capacity of the latch 132 to move the cross bar 128 to a position whereby it in turn moves the switch lever 36 to an "on" position.

Referring now to FIGURES 10 and 11 in particular, it will be seen that there is illustrated a modified form of attachment which is referred to in general by the reference numeral 172. The attachment 172 includes a base 174 which is identical with the base 116. Extending upwardly from the base 174 are actuating rods 176 and 178 which are identical to the rods 124 and 126, respectively, and which are connected together by a cross bar 180, identical to the cross bar 128.

Carried by the upper portions of the rods 176 and 178 is a cup or container top engaging unit 182 which is identical to the cup unit 72. However, carried by the rods 176 and 178 above the cover unit 182 are telescoping constant force coil bar springs 184 which engage the upper ends of the sleeve 186 of the cover unit 182. The upper ends of the springs 184 also engage the cross bar 180.

In the use of the attachment, the cover unit 182 and the rods 176 and 178 are supported by coil springs 188 disposed in the base 174. As the container 88 is being positioned the cover unit 182 is moved upwardly against the compression of the springs 184. This results in the upward movement of the rods 176 and 178 and the cross bar 180 so that the cross bar 180 lifts the switch lever 36. This, of course, energizes the electric motor 18. However, the upper end of the container 88 is sealed by the cover unit 182. Further upward movement of the container 88 and the cover unit 182 permits the container 88 to be seated on the container support 28. The construction of the springs 184 is such that irrespective of the amount which they are compressed within the compressible range thereof, the force required to compress the springs 184 remains constant. Thus the cover unit 182 is held in place on the container 88 under the proper compressing engagement at all times irrespective of variations and heights of the container 88.

From the foregoing, it will be seen that there has been devised several forms of attachments for drink mixers, which attachments are so constructed whereby they may be used to function with paper containers and other types of containers normally used in conjunction with drink mixers and which will seal the drink mixers as is required so as to prevent splashing thus rendering the drink mixer unsanitary.

Further, the attachment firmly holds the container during the mixing operation and requires no attention on the part of the operator. In addition to this, the covers of the various cover units may be readily removed and washed so that the covers may remain sanitary at all times. A further advantage of the present invention is that it may be secured in place by merely removing one fastener, positioning the attachment and then replacing the fastener.

Although only one illustrative form of drink mixer has been shown in the drawings, it is to be understood that the drink mixer attachment is universal in that it may be attached to all types of existing drink mixers. It is to be understood that drink mixers made by different companies vary in design and/or manner of operation. However, the differences of design and/or manner of operation are of such a nature whereby the attachments disclosed herein will readily conform to the variations in design and/or manner of operation and may be interchanged from one manufacturer's drink mixer to another. This universal use of the attachment, together with the universal adaptation of the attachment to all types of cups, irrespective of height, makes the attachment readily adaptable to any operation. Furthermore, the fact that the attachment automatically adapts to cups of all heights greatly facilitates the use of the attachment and a drink mixer on which the attachment is mounted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drink mixer attachment in combination with a drink mixer, said drink mixer including a supporting frame, a motor fixed to the supporting frame and a rotor shaft fixedly secured to the motor for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and means engaged with said rods for urging said cross bar into a mixer operating position.

2. A drink mixer attachment in combination with a drink mixer, said drink mixer including a supporting frame, a motor fixed to the supporting frame and a rotor shaft fixedly secured to the motor for use with containers, said drink mixer attachment including a container support, a base fixed relative to said container support, a pair of rods, means on said base for guiding upward movement of the rods, a cross bar connecting together upper portions of said rods, drink mixer control mechanism, said cross bar being alignable with said drink mixer control mechanism, a container cover unit mounted on said rods, and means engaged with said rods for urging said cross bar into a mixer operating position, said container cover unit including a supporting bracket mounted on said rods for sliding movement, said supporting bracket having a resilient clip, and a cover releasably supported by said resilient clip whereby said cover may be readily removed to facilitate cleaning thereof.

3. A drink mixer attachment in combination with a drink mixer for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and means engaged with said rods for urging said cross bar into a mixer operating position, said cover unit including a two-piece cover, said cover including a central portion with an eccentrically disposed opening for receiving a drink mixer shaft, and an outer portion for engaging a container, said outer portion being disposed eccentrically of said central portion to compensate for differences in positions of shafts in various models of drink mixers.

4. A drink mixer attachment in combination with a drink mixer for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and means engaged with said rods for urging said cross bar into a mixer operating position, said container cover unit including a supporting bracket mounted on said rods for sliding movement, said supporting bracket having a resilient clip, and a cover releasably supported by said resilient clip whereby said cover may be readily removed to facilitate cleaning thereof, said cover being of a two-piece construction and including a central portion with an eccentrically disposed opening for receiving a drink mixer shaft, and an outer portion for engaging a container, said outer portion being disposed eccentrically of said central portion to compensate for differences in positions of shafts in various models of drink mixers.

5. A drink mixer attachment in combination with a drink mixer, said drink mixer including a supporting frame, a motor fixed to the supporting frame and a rotor shaft fixedly secured to the motor for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and means engaged with said rods for urging said cross bar into a mixer operating position, said container support being secured in place by said base.

6. A drink mixer attachment in combination with a drink mixer for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, spring means carried by said base and engaging lower ends of said rods to urge said cross bar into a mixer operating position, and latch means carried by said base and normally engaged with one of said rods to retain said cross bar in an inoperative position.

7. A drink mixer attachment in combination with a drink mixer for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and jack means carried by said cover unit and engaging one of said rods for lifting said cross bar into a mixer operating position.

8. A drink mixer attachment in combination with a drink mixer for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and jack means carried by said cover unit and engaging one of said rods for lifting said cross bar into a mixer operating position, said base including means engaging said rods to initially position said cross bar.

9. A drink mixer attachment in conbination with a drink mixer for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and spring means on said rods intermediate said cover unit and said cross bar to urge said cross bar into a mixer operating position.

10. A drink mixer attachment in combination with a drink mixer for use with containers, said drink mixer attachment including a container support, a base fixed relative to said container support, a pair of rods, means on said base for guiding upward movement of the rods, a cross bar connecting together upper portions of said rods, a drink mixer control mechanism, said cross bar being alignable with said drink mixer control mechanism, a container cover unit mounted on said rods, and spring means on said rods intermediate said cover unit and said cross bar to urge said cross bar into a mixer operating position, said base including means engaging said rods to initially position said cross bar.

11. A drink mixer attachment in combination with a drink mixer for use with containers, said drink mixer attachment comprising container bottom support means anchored to the drink mixer, drink mixer control mechanism, actuating means, means on the support means guidingly mounting the actuating means for upward movement for engagement with the control mechanism, container top engaging means movably mounted on the actuating means and fixed pressure means operatively connected to the actuating means effective to move the actuating means into engagement with the control mechanism with a fixed force after movement of the container top engaging means by a container to a position wherein the container is supported at its bottom by the bottom support means.

12. The combination of claim 11, wherein said fixed pressure means comprises spring means biasing the actuating means into engagement with the control mechanism and selectively releasable means mounted on the support means and engageable with the actuating means for holding the actuating means out of engagement with the control mechanism.

13. The combination of claim 11, wherein the fixed pressure means comprises constant force spring means operatively connecting the actuating means to the container top engaging means.

*14. A drink mixer adapter for a drink mixer having a frame carrying a mixer-driving motor and control mechanism movable to effect driving of the mixer by such motor, said drink mixer adapter comprising container bottom support means anchored to the drink mixer frame, actuating means, means on the container bottom support means guidingly mounting said actuating means for upward movement into engagement with the control mechanism, container rim-engaging means movably mounted on said actuating means, and spring means operable to move said actuating means for effecting mixer-driving movement of the control mechanism after engagement and movement of the container rim-engaging means by a container.*

*15. A drink mixer adapter for a drink mixer having a frame carrying a mixer-driving motor and control mechanism operable to effect driving of the mixer by such motor, said adapter comprising a container support carried by the mixer frame, a base fixed relative to said container support, a pair of rods extending upwardly above said base, guide means on said base guiding said rods for lengthwise movement relative to the mixer frame, a cross bar connecting upper portions of said rods and movable to effect operation of the control mechanism, container-engageable means carried by said rods, and means engaged with said rods for urging them lengthwise to move said cross bar for effecting mixer-driving actuation of the control mechanism.*

*16. A drink mixer adapter for a drink mixer having a frame carrying a mixer-driving motor, control means operable to effect driving of the mixer by such motor and a container support, said adapter comprising a base fixed relative to the container support, enlongated upright means extending upwardly above said base, guide means on said base guiding said elongated upright means for lengthwise movement relative to the mixer frame, an actuating member carried by said elongated upright means and movable to effect operation of the control means, container-engageable means carried by said elongated upright means, and spring means engaged with said elongated upright means for urging said elongated upright means lengthwise to move said actuating member for effecting mixer-driving actuation of the control means.*

*17. A drink mixer adapter for a drink mixer having a frame carrying a mixer-driving motor and a control member movable to effect driving of the mixer by such motor, said adapter comprising actuating means engageable with the control member by upward movement for effecting mixer-driving movement of the control member, means guiding said acuating means for movement relative to the mixer frame for effecting mixer-driving movement of the control member, and container-engageable means operatively connected to said actuating means, engageable by containers in which drinks are to be mixed by the drink mixer and movable upward in conjunction with upward movement of the container and relative to said actuating means through different distances corresponding to the heights of the respective containers engaged therewith.*

*18. A drink mixer adapter for a drink mixer having a frame carrying a mixer-driving motor and a control member movable to effect driving of the mixer by such motor, said adapter comprising actuating means engageable with the control member by upward movement for effecting mixer-driving movement of the control member, means guiding said actuating means for movement relative to the mixer frame for effecting mixer-driving movement of the control member, container-engageable means engageable by a container in which a drink is to be mixed by the drink mixer and movable upward in conjunction with upward movement of the container, means guiding said container-engageable means for upward movement relative to said actuating means, and spring means engaged between said container-engageable means and said actuating means to effect upward movement of said actuating means by upward movement of said container-engageable means for moving the control member into mixer-driving position.*

*19. A drink mixer adapter for a drink mixer having a frame carrying a mixer-driving motor and a control mem-*

*ber movable to effect driving of the mixer by such motor, said adapter comprising actuating means engageable with the control member by upward movement for effecting mixer-driving movement of the control member, means guiding said actuating means for movement relative to the mixer frame for effecting mixer-driving movement of the control member, container-engageable means operatively connected to said actuating means, engageable by a container in which a drink is to be mixed by the drink mixer and movable upward in conjunction with upward movement of the container, and spring means operable to effect upward movement of said actuating means for moving the control member into mixer-driving position.*

*20. A drink mixer adapter for a drink mixer having a frame carrying a mixer-driving motor and a control member movable to effect driving of the mixer by such motor, said adapter comprising actuating means engageable with the control member by upward movement for effecting mixer-driving movement of the control member, means guiding said actuating means for movement relative to the mixer frame for effecting mixer-driving movement of the control member, container-engageable means operatively connected to said actuating means, engageable by*

*a container in which a drink is to be mixed by the drink mixer and movable upward in conjunction with upward movement of the container, and spring means operable by upward movement of said container-engageable means to effect upward movement of said actuating means for moving the control member into mixer-driving position.*

*21. The drink mixer adapter defined in claim 20, in which the container-engageable means is a cover engageable by the rim of the container.*

References Cited in the file of this patent or the original patent

UNITED STATES PATENTS

| | | |
|---|---|---|
| 1,233,823 | Tiger et al. | July 17, 1917 |
| 1,291,728 | Beach | Jan. 21, 1919 |
| 1,477,404 | Watson | Dec. 11, 1924 |
| 1,519,662 | Brown | Dec. 16, 1924 |
| 1,521,038 | Moore | Dec. 30, 1924 |
| 2,295,098 | Cornell | Sept. 8, 1942 |
| 2,324,179 | Srob | July 13, 1943 |

FOREIGN PATENTS

| | | |
|---|---|---|
| 97,243 | Sweden | Oct. 31, 1939 |